Patented June 25, 1935

2,006,146

UNITED STATES PATENT OFFICE 2,006,146

POTATO FOOD PRODUCT

George P. Miller, Naperville, Ill.

No Drawing. Application December 1, 1933,
Serial No. 700,565

6 Claims. (Cl. 99—8)

This invention relates to improvements in food products, and more particularly to a new food product, the base of which is the substance of the ordinary white potato.

The object of the invention is to provide a food product essentially different in taste and appearance from potato in the forms in which it is ordinarily prepared for consumption, and characterized particularly by a solid yet decidedly plastic consistency permitting its use in various new and novel ways both alone or in combination with other food products.

The following is a full disclosure of the product and the preferred method of producing the same:

It is to be understood at the outset that the finished product is a semi-prepared food quite edible although not altogether palatable, and hence further cooking such as frying is desirable in order to bring out the full flavor and render it more suitable for consumption. Moreover, the product is preferably put up in sealed containers for storage and distribution or packed as a canned product by the usual canning process.

As already stated, the base of the product is the substance of the ordinary white potato in its raw state and composed largely of water and starch, the latter in the form of closely knit cells or granules. In its raw state the white potato in common with certain other vegetables and fruits, is particularly susceptible to enzymatic action when exposed to the atmosphere, causing rapid discoloration unless retarded or neutralized either by heat, as by boiling or other method of cooking, or by the addition of some neutralizing agent such as certain organic acids.

It is primarily because of the difficulty of effectively or completely eliminating enzyme action that the white potato, either in its raw or cooked state, has not been preserved or canned with any degree of success or having been so treated, has not retained its natural color or qualities.

However, it is possible by the process herein disclosed to alter the chemical structure of the natural ingredients of the potato to such an extent as to not only produce a stable product, that is, not subject to enzyme action, but one that lends itself to many uses in which neither the appearance nor the ordinary flavor of a cooked potato is discernible.

The first step in the process of preparing the product is to peel the potatoes, then divide or shred them into fine string-like particles, the reduction of the potato to a divided or shredded state being in the nature of a cutting or slicing operation and not a mashing or extruding operation under pressure, in order that the physical structure of the potato will not be altered.

The potato in its shredded state is then introduced immediately into a closed vessel or chest through which steam is allowed to pass for a predetermined short period of time, the temperature of the steam at slightly more than atmospheric pressure being approximately 225° F. The result of the steam treatment is two-fold: First, the steam circulating through the mass, subjects each particle to an enzyme retarding action, and, secondly, the ingredients of the potato undergo a definite chemical and physical change essential to the desired qualities and properties of the ultimate product. The retardation of the enzyme action is of importance in that it preserves the natural potato color of the product until such time as it is consumed, and otherwise insures the uniformity of quality and appearance.

In the matter of the chemical and physical change that takes place by reason of the steam, it will be borne in mind that the raw substance of the potato is starch in the form of granules composed of minute rings or annular layers arranged concentrically about a nucleus. Thus when the starch granules are exposed to steam, they swell up and burst, this physical change being accompanied by the conversion of the starch into a number of complex organic compounds, including dextrine, simple sugars and amylopectin, the latter a gelatinous substance of a somewhat opalescent appearance.

Thus with the thorough impregnation of the shredded mass by the steam, each shred maintains its original form, although undergoing both a physical and chemical change, consisting of the conversion of the starch in the surface layers into amylopectin, accompanied by a swelling of the particles and their change to a soft jelly-like consistency somewhat opalescent in appearance.

Now, inasmuch as the continued action of the steam upon the mass would in time reduce it to a state of solution, it is important that the steam treatment be carried only to the point of converting the starch into a homogeneous mass made up of the gelatine-like particles, and hence the steam treatment is continued only for a relatively short period, say three (3) minutes, after which the shredded mass is removed from the steam chest preparatory to immediate use or for canning or other modes of preserving. In this connection it will be observed that the time occupied by the steam treatment may vary somewhat under different operating conditions, although it is a rather simple matter to determine by experiment the precise period of treatment.

In the event it is desired to can the product for commercial distribution or preserve it for future use, the usual canning or preserving methods may be followed, namely, the packing of the shredded mass into cans or other containers, sealing them and subjecting them to heat for a given period of time. For the most satisfactory results, the canned product is processed at temperatures ranging from 230° F. to 240° F. for periods from 80 to 140 minutes, the time being shortened with the increase in the temperature of the steam used in the processing operation, and vice versa.

As the result of the processing, the product is necessarily again subjected to relatively high temperature treatment, but as already pointed out, this does not essentially alter either the physical characteristics of the product or the chemical composition of its ingredients. However, it does have a beneficial if not desirable effect on the product, namely, of destroying any bacteria that may be present, and to otherwise sterilize the product against the possibility of bacteria growth.

Thus, once the product is canned and processed, it may be distributed and stored for long periods of time without deterioration in the same way as other canned products.

The product as it comes from its can or container, has practically the same consistency as it does immediately prior to canning, namely, a solid plastic mass uniformly moist and dense throughout, with its shredded texture preserved. Thus on removing the product from the can it retains its solidity to the extent that it can be readily sliced with a knife.

The uses of the product as an article of food are too numerous to recite. Perhaps the simplest form in which it may be served is the slicing of the contents of a can as it is extruded from one end thereof into thin circular patties and frying them in deep fat, the result being a thoroughly cooked wafer having a crisp brown surface layer.

As a prepared article of food, it is scarcely recognized as potato either in appearance or flavor, resembling more the taste of rice, but at the same time quite pleasing and altogether digestable. Again, being of a plastic consistency, the product can be rolled out to a thin layer and thus made the covering or envelope for other articles of food, such as sausage, and when fried in deep fat makes a very appetizing article of food, such as would be dispensed from a booth or sold over a counter for immediate consumption. On the other hand, it can be served in various forms and combinations for home consumption, making it a convenient, nourishing and appetizing addition to the menu.

Having set forth the nature and characteristics of the product, together with the process for its making and preparation for consumption,

I claim as my invention:

1. The process of preparing the substance of white potato for subsequent cooking, consisting of reducing the peeled potato to a finely divided texture without destroying its cell structure, and subjecting the finely divided particles to contact with steam until each particle acquires a sticky gelatinous coating of the partially converted starches.

2. The process of preparing white potatoes in a form for subsequent cooking, consisting of reducing the raw potato to a mass of shredded particles and passing steam through the mass for a relatively short period of time, whereby each individual particle undergoes a partial conversion of its starch content to sugars in the form of a sticky gelatinous coating.

3. The process of preparing white potatoes for subsequent cooking, consisting of shredding the raw potato without destroying its natural cell structure, introducing the shredded mass into a closed vessel, and passing steam through the mass within the vessel until each individual shred is coated with a sticky gelatinous substance composed of the resulting conversion products of the starches into sugars including amylopectin.

4. The process of preparing white potatoes for subsequent cooking, consisting of shredding the raw potato, immediately introducing the shredded mass into a closed vessel, and passing steam through the vessel until the mass is reduced to a partially converted state in which the individual shreds are coated with amylopectin.

5. The process of preserving white potatoes for subsequent cooking, consisting of shredding the raw potato without destroying its natural cell structure, immediately introducing the shredded mass into a closed vessel, passing steam through the mass within the vessel until each individual shred is coated with a sticky gelatinous substance composed of the resulting conversion products of the starches into sugars including amylopectin, and finally preserving the product in sealed containers.

6. The process of preserving white potatoes for subsequent cooking, consisting of shredding the raw potato without destroying its natural cell structure, immediately introducing the shredded mass into a closed vessel, passing steam through the mass within the vessel until each individual shred is coated with a sticky gelatinous substance composed of the resulting conversion products of the starches into sugars, packing the product in sealed containers and processing the same under predetermined temperature conditions.

GEORGE P. MILLER.